March 29, 1960     A. W. LUNDELL     2,930,422
COMMODITY SUPPORTS FOR SLICING MACHINES
Filed May 26, 1958
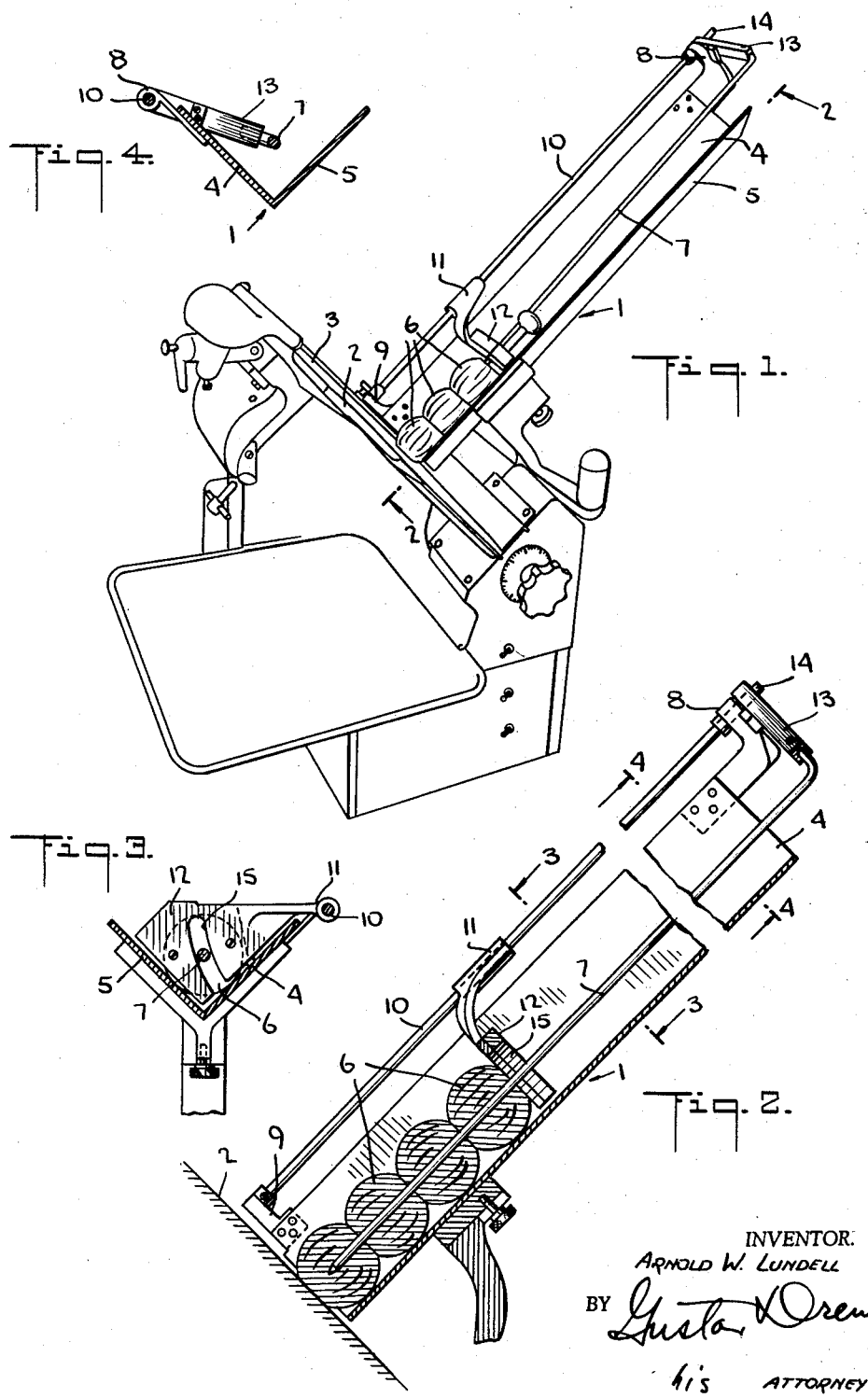
INVENTOR.
ARNOLD W. LUNDELL
BY
his ATTORNEY United States Patent Office 2,930,422
Patented Mar. 29, 1960

2,930,422

COMMODITY SUPPORTS FOR SLICING MACHINES

Arnold W. Lundell, Byram, Conn., assignor to Globe Slicing Machine Co., Inc., Stamford, Conn., a corporation of New York Application May 26, 1958, Serial No. 737,593

2 Claims. (Cl. 146—217)

This invention relates to commodity supports for slicing machines such as disclosed in United States Letters Patent No. 2,822,011 dated February 4, 1958 and particularly to supports for substantially round commodities such as oranges, lemons, apples, pineapples, onions, tomatoes, beets, round cheeses such as Edam and Gouda, meats, and the like, while being sliced which commodities are required to be sliced or cut into slices of a substantially predetermined thickness from a substantially predetermined section of the commodity being cut.

Among the objects of the present invention it is aimed to provide an improved support for a slicing machine for cutting or slicing round commodities such as oranges, lemons, apples, pineapples, onions, tomatoes, beets, round cheeses, meats, and the like, while being sliced which commodities are required to be sliced or cut into slices of a substantially predetermined thickness and from a substantially predetermined section of a substantially round commodity consisting in providing the slidable frame of the commodity carrier, or chute with a bracket extending from one side of the commodity carrier or chute having a pin extending vertically to the path of movement of the chute or carrier which pin will successively pierce a plurality of commodities such as oranges, lemons, apples, pineapples, onions, tomatoes, beets, round cheeses, meats, and the like and cooperating with an end weight to enable the commodities successively to be advanced to the cutting knife.

In canneries which can large quantities of slices of fruits and vegetables such as oranges, grapefruit, pineapples, tomatoes and beets and the like, restaurants, hotels and institutions which serve large quantities of sliced oranges, lemons, apples, pineapples, onions, tomatoes, beets, round cheeses, meats, and the like, considerable difficulty has been encountered in producing slices that are not only substantially uniform in thickness but also slices which are cut from a substantially predetermined section of the commodity being cut. With this difficulty in mind, the present invention aims to provide an improved support for a slicing machine of the type illustrated in my patent aforesaid having a slidably mounted commodity chute which is equipped with a hinge pin on one side of which is pivotally and slidably mounted an end weight and also pivotally and removably mounted a bracket having a piercing pin extending substantially vertically to the path of movement of the chute to pierce a plurality of successively stacked substantially round commodity items such as certain fruits, vegetables, cheeses, meats and the like in which the lower end of the lowermost commodity is free of said piercing pin to facilitate cooperation with the cutting knife and in which the end weight is movable to rest on the upper face of the sole commodity or the upper face of the uppermost commodity of a stack of commodities to urge the commodity, or the commodities constituting the stack successively, into cutting engagement with the knife.

These and other features, capabilities, and advantages of the invention will appear from the subjoined, detailed description of one specific embodiment thereof illustrated in the accompanying drawings in which:

Fig. 1 is a perspective of a slicing machine having an inclined knife and reciprocating chute equipped with the improved commodity support.

Fig. 2 is a section on the line 2—2 of Fig. 1.

Fig. 3 is a section on the line 3—3 of Fig. 2.

Fig. 4 is a section on the line 4—4 of Fig. 2.

In the embodiment shown the slicing machine as disclosed in my Patent No. 2,822,011 aforesaid, is equipped with a two-wing, trough-shaped, inclined or gravity feed chute 1 reciprocably mounted relative to the gauge plate 2 and rotatable knife 3. The conventional wings 4 and 5 on the chute may vary in length depending upon the number of commodities 6; it may be desired to cut with a predetermined setting of the piercing pin 7 which wings 4 and 5 extend substantially vertically to the gauge plate 2. In actual practice, the commodity such as the commodity 6 would be positioned in the dihedral angle between the wings 4 and 5 and rest on the gauge plate 2. In the present instance the wing 4 has brackets 8 and 9 extending from its outer, upper and lower ends respectively in the free ends of which are mounted the ends of the hinge pin 10. Between the brackets 8 and 9, the boss 11 of the pusher member or end weight 12 is slidably and pivotally mounted. The end weight 12 in an operative or commodity advance position as shown in Fig. 1 rests on the upper face of the sole commodity or on the upper face of the uppermost commodity 6 of a vertical stack of commodities. In order to maintain one of the vertical stacks of commodities 6 in position while being sliced, there is provided the piercing pin or needle 7 which is pierced from the top down through a stack of commodities 6 as shown in Figs. 1 and 2. The pin 7 is formed at the end of the arm 13 which is pivotally mounted on the extension 14 of the hinge pin 10, said pin extending substantially vertical to the gauge plate 2 and rotary knife 3 as shown in Fig. 1. To facilitate impaling a stack of commodities 6 on the pin 7, the arm 13 is swung clear of the plates 4 and 5 and after the commodities 6 have been captured, that is impaled on the pin 7, the pin 7 with its commodities 6 is swung into supporting position on the wings 4 and 5 and gauge plate 2 as shown in Figs. 1 and 2. Thereupon the end weight 12 is swung over to engage the upper face of the uppermost commodity 6. In order to facilitate properly positioning the end weight 12 on the uppermost commodity 6, the end weight 12 is provided with an arcuate recess 15 described concentric with the hinge pin 10. The lower end of the pin 7 obviously is pointed to facilitate piercing a commodity and in turn is spaced from the gauge plate 2 to clear the same when the chute 1 is reciprocated across the gauge plate 2.

The extension 14 of the hinge pin 10 is smaller in diameter than the diameter of the hole in the arm 13 to facilitate ready removal of the arm 13 and pin 7 from the extension 14. Consequently, a number of pins 7 may be provided and previously supplied with commodities 6 so that as the supply of the commodities 6 on one pin is exhausted, another one may be inserted and the delay between slicing of successive supplies avoided.

The removability of the spindle or pin 7 from the extension 14 of course also enables preloading of a number of spindles while the slicing operation is taking place and in turn also enables reloading a single spindle 7 after the supply on the same has been exhausted.

Attention is also called to the fact that the spindle 7 not only serves to maintain a supply of round commodities 6 one above the other so that they may be successively sliced but also prevents rolling of round commodities as they are carried across the gauge plate 2. In other words, when the chute 1 is reciprocated to and from the rotary slicing knife 3, if the commodity is round as is the case with the commodity 6, obviously such commodities would roll along the gauge plate 2. Consequently, if not anchored in position, when the chute 1 would cause the commodity 6 to engage the knife 3, the knife might not cut slices but merely make objectionable cuts in the commodity. However, when the commodities 6 are mounted on the spindles 7, although they may be permitted to rotate on the spindles 7, there is little likelihood of such rotation and rolling of the commodity 6 is positively prevented.

It is obvious that various changes and modifications may be made to the details and construction without departing from the general scope of the invention as set forth in the accompanying claims.

I claim:

1. A trough-shaped reciprocatable gravity feed chute for use with a rotary slicing knife, a support operatively connected to said chute, a piercing pin operatively connected to said support and extending along said chute for substantially the entire length thereof and terminating adjacent the lower end thereof, whereby an article in said chute impaled on said pin will be fed downwardly of said chute in a definite predetermined relationship.

2. A trough-shaped reciprocatable inclined chute for use with a rotary slicing knife, a support operatively connected to said chute, a piercing pin operatively connected to said support and extending along said chute for substantially the entire length thereof and terminating adjacent the lower end thereof, and a pusher member slidable in said chute and embracing said piercing pin, whereby an article in said chute impaled on said pin will be fed downwardly of said chute in a definite predetermined relationship.

References Cited in the file of this patent

UNITED STATES PATENTS

| | | |
|---|---|---|
| 1,199,389 | Kopacki | Sept. 26, 1916 |
| 2,598,740 | Zimmerman | June 3, 1952 |